(12) United States Patent
Thiele et al.

(10) Patent No.: US 12,311,600 B2
(45) Date of Patent: May 27, 2025

(54) ACTUATABLE OPTICAL DEVICE, METHOD OF FABRICATING THE DEVICE, AND USE OF A MAGNETIC SUBSTANCE

(71) Applicant: Baden-Wuerttemberg Stiftung gGmbH, Stuttgart (DE)

(72) Inventors: Simon Thiele, Stuttgart (DE); Chris Jung, Rielasingen-Worblingen (DE); Harald Giessen, Marnheim (DE); Alois M. Herkommer, Aalen (DE)

(73) Assignee: Baden-Wuerttemberg Stiftung gGmbH, Stuttgart (DE)

( * ) Notice: Subject to any disclaimer, the term of this patent is extended or adjusted under 35 U.S.C. 154(b) by 366 days.

(21) Appl. No.: 17/151,910

(22) Filed: Jan. 19, 2021

(65) Prior Publication Data
US 2021/0221059 A1    Jul. 22, 2021

(30) Foreign Application Priority Data

Jan. 20, 2020  (EP) .................................... 20152575

(51) Int. Cl.
*B29C 64/268*   (2017.01)
*B01L 3/00*     (2006.01)
(Continued)

(52) U.S. Cl.
CPC ...... *B29C 64/268* (2017.08); *B01L 3/502707* (2013.01); *B29C 64/135* (2017.08); *B33Y 50/02* (2014.12)

(58) Field of Classification Search
CPC ..... B29C 64/268; B29C 64/135; B33Y 50/02; B01L 3/50277
See application file for complete search history.

(56) References Cited

U.S. PATENT DOCUMENTS 8,279,541 B2 * 10/2012 Henderson ............. H02N 2/026
                                                      359/811
8,358,924 B2 *  1/2013 Ollila ....................... G03B 3/10
                                                      310/12.14
(Continued)

FOREIGN PATENT DOCUMENTS

WO    2017/052769 A1    3/2017

OTHER PUBLICATIONS

Wang et al., Multifunctional ferrofluid-infused surfaces with reconfigurable multiscale topography. Nature 559, 77-82 (2018). https://doi.org/10.1038/s41586-018-0250-8. (Year: 2018).*

(Continued)

*Primary Examiner* — Peter Radkowski
(74) *Attorney, Agent, or Firm* — MEDLER FERRO WOODHOUSE & MILLS PLLC

(57) ABSTRACT

The invention relates to a 3D-printed actuatable optical device and a method for fabricating the actuatable optical device. The method comprises the following steps:
  forming a three-dimensional structure (50) of the optical device (100) with the aid of a 3D printer in such a way that the three-dimensional structure (50) has:
    at least one optical element, and
    at least one microfluidic cavity (4) for accommodating a magnetic substance (6);
  filling the at least one microfluidic cavity (4) with the magnetic substance (6).
The invention further relates to the use of a magnetizable fluid for fabricating a magnetically actuatable optical device.

13 Claims, 8 Drawing Sheets

(51) Int. Cl.
    *B29C 64/135*      (2017.01)
    *B33Y 50/02*      (2015.01)

(56) References Cited

U.S. PATENT DOCUMENTS

| | | | | |
|---|---|---|---|---|
| 8,803,986 | B2* | 8/2014 | Sato | H02N 2/163 |
| | | | | 348/208.5 |
| 8,995,241 | B1* | 3/2015 | Heo | G11B 7/0935 |
| | | | | 359/557 |
| 9,645,472 | B2* | 5/2017 | Ollila | G02B 26/004 |
| 9,746,689 | B2* | 8/2017 | Ollila | H04N 23/60 |
| 9,749,536 | B2* | 8/2017 | Ollila | H04N 23/57 |
| 9,781,345 | B1* | 10/2017 | Miller | G02B 7/09 |
| 9,848,108 | B2* | 12/2017 | Nakamura | H04N 23/685 |
| 10,257,433 | B2* | 4/2019 | Eromäki | G02B 27/646 |
| 10,382,698 | B2* | 8/2019 | Sharma | G02B 27/646 |
| 10,488,917 | B2* | 11/2019 | Ollila | G06F 3/012 |
| 10,516,826 | B2* | 12/2019 | Miller | G02B 27/646 |
| 10,656,407 | B2* | 5/2020 | Ollila | H04N 23/957 |
| 10,750,096 | B2* | 8/2020 | Sharma | H04N 23/54 |
| 10,931,877 | B2* | 2/2021 | Miller | H04N 23/57 |
| 10,946,579 | B2* | 3/2021 | Solgaard | B29C 64/118 |
| 11,102,416 | B2* | 8/2021 | Sharma | H04N 23/54 |
| 11,112,681 | B2* | 9/2021 | Fujinaka | G03B 17/14 |
| 11,619,863 | B2* | 4/2023 | Fujinaka | G02B 7/08 |
| | | | | 396/133 |
| 2006/0153556 | A1 | 7/2006 | Lee | |
| 2011/0141584 | A1* | 6/2011 | Henderson | G02B 7/022 |
| | | | | 359/896 |
| 2011/0150441 | A1* | 6/2011 | Ollila | H04N 23/54 |
| | | | | 396/55 |
| 2016/0050373 | A1* | 2/2016 | Nakamura | G03B 5/02 |
| | | | | 348/208.11 |
| 2016/0377960 | A1* | 12/2016 | Ollila | G03B 9/08 |
| | | | | 396/463 |
| 2016/0381294 | A1* | 12/2016 | Ollila | H04N 23/57 |
| | | | | 348/208.11 |
| 2017/0059880 | A1* | 3/2017 | Fujinaka | G02B 27/646 |
| 2017/0090211 | A1* | 3/2017 | Ollila | H04N 23/57 |
| 2017/0094187 | A1* | 3/2017 | Sharma | G02B 7/09 |
| 2018/0003947 | A1* | 1/2018 | Ollila | G02B 3/12 |
| 2018/0027185 | A1* | 1/2018 | Miller | G02B 27/646 |
| | | | | 348/208.11 |
| 2018/0319110 | A1* | 11/2018 | Solgaard | B29C 67/00 |
| 2019/0258314 | A1* | 8/2019 | Ollila | G02B 27/0172 |
| 2019/0364217 | A1* | 11/2019 | Sharma | G02B 7/09 |
| 2020/0117074 | A1* | 4/2020 | Fujinaka | G03B 5/00 |
| 2020/0128184 | A1* | 4/2020 | Miller | G02B 7/08 |
| 2020/0382709 | A1* | 12/2020 | Sharma | H04N 23/55 |
| 2021/0364889 | A1* | 11/2021 | Fujinaka | G02B 7/14 |
| 2021/0385387 | A1* | 12/2021 | Sharma | G03B 5/02 |

OTHER PUBLICATIONS

Huang et al (2017). Damping Applications of Ferrofluids: A Review. Journal of Magnetics. 22. 109-121. 10.4283/JMAG.2017.22.1.109 (Year: 2017).*

Hiemstra, David, The Design of Moving Magnet Actuators for Large-Range Flexure-Based Nanopositioning, Thesis, University of Michigan, 2014. (Year: 2014).*

Khan, Tasnova, Development of a Ferrofluid Based Soft Actuator Using Magnetic Field Optimization, Thesis, School of Engineering and Technology Thailand, 2019. (Year: 2019).*

Gissibl, T., Thiele, S., Herkommer, A. et al. Sub-micrometre accurate free-form optics by three-dimensional printing on single-mode fibres. Nat Commun 7, 11763 (2016). https://doi.org/10.1038/ncomms11763 (Year: 2016).*

Yang, Jingyi, Ghimire, Indra, Wu, Pin Chieh, Gurung, Sudip, Arndt, Catherine, Tsai, Din Ping and Lee, Ho Wai Howard. "Photonic crystal fiber metalens" Nanophotonics, vol. 8, No. 3, 2019, pp. 443-449. https://doi.org/10.1515/nanoph-2018-0204 (Year: 2019).*

Lazarus et al. Creating 3D printed magnetic devices with ferrofluids and liquid metals, Additive Manufacturing 26 (2019) 15-21. (Year: 2019).*

He, Liang & Peng, Huaishu & Land, Joshua & Fuge, Mark & Froehlich, Jon. (2017). Designing 3D-Printed Deformation Behaviors Using Spring-Based Structures: An Initial Investigation. 151-153. 10.1145/3131785.3131836. (Year: 2017).*

Chung, Su Eun & Dong, Xiaoguang & Sitti, Metin. (2015). Three-dimensional heterogeneous assembly of coded microgels using an untethered mobile microgripper. Lab Chip. 15. 10.1039/C5LC00009B (Year: 2015).*

Dietrich, PI., Blaicher, M., Reuter, I. et al. In situ 3D nanoprinting of free-form coupling elements for hybrid photonic integration. Nature Photon 12, 241-247 (2018). https://doi.org/10.1038/s41566-018-0133-4 (Year: 2018).*

Sundaram et al., Topology optimization and 3D printing of multimaterial magnetic actuators and displays, Sci. Adv. 2019;5: eaaw1160 (Year: 2019).*

Schaffner, M., Faber, J.A., Pianegonda, L. et al. 3D printing of robotic soft actuators with programmable bioinspired architectures. Nat Commun 9, 878 (2018). https://doi.org/10.1038/s41467-018-03216-w (Year: 2018).*

He et al., 2019. Ondulé: Designing and Controlling 3D Printable Springs. In Proceedings of the 32nd Annual ACM Symposium on User Interface Software and Technology (UIST '19). Association for Computing Machinery, New York, NY, USA, 739-750. https://doi.org/10.1145/3332165.3347951 (Year: 2019).*

Eun Jung Min, Jihoon Na, Seon Young Ryu, and Byeong Ha Lee, "Single-body lensed-fiber scanning probe actuated by magnetic force for optical imaging," Opt. Lett. 34, 1897-1899 (2009) (Year: 2009).*

Min et al., "Two dimensional scanning probe using off-axis magnetic force of single solenoid for 3D Oct imaging," Proc. SPIE 7904, Three-Dimensional and Multidimensional Microscopy: Image Acquisition and Processing XVIII, 79041N (Feb. 23, 2011); https://doi.org/10.1 (Year: 2011).*

T Mitsui et al., A 2-axis optical scanner driven nonresonantly by electromagnetic force for OCT imaging, 2006 J. Micromech. Microeng. 16 2482 (Year: 2006).*

Pandojirao-Sunkojirao et al. (2009) A Magnetic Actuator for Fiber-Optic Applications, International Journal of Optomechatronics, 3:3, 215-232, DOI: 10.1080/15599610903174440 (Year: 2009).*

European International Search Report dated Jul. 30, 2020, in EP Appl. No. 20 15 2575.

Cao Guangyi et al., "Real-time vertical/horizontal section imaging and 3D image construction using a 3-axis electromagnetic confocal microscanner", 2017 19th International Conference on Solid-State Sensors, Actuators and Microsystems (Transducers), IEEE, Jun. 18, 2017 (Jun. 18, 2017), Seiten254-257, XP033130702,DOI: 10.1109/TRANSDUCERS.2017.7994036 [gefunden am Jul. 26, 2017].

Savas Janset et al., "Towards 3D printed confocal endoscopy", Proceedings of SPIE; [Proceedings of SPIE ISSN 0277-786X vol. 10524], SPIE, US, Bd. 9948, Sep. 28, 2016 (Sep. 28, 2016), Seiten 99480D-99480D, XP060077873, DOI: 10.1117/12.2236641, ISBN: 978-1-5106-1533-5.

Henry E. Williams, et al., "Fabrication of three-dimensional microphotonic structures on the tip of optical fibers using SU-8", Optics Express, Bd. 19. Nr. 23, Oct. 27, 2011 (2011-10-27), Seiten 22910-22922, XP055337463,DOI: 10.1364/OE.19.022910.

* cited by examiner

B = 0

B ≠ 0

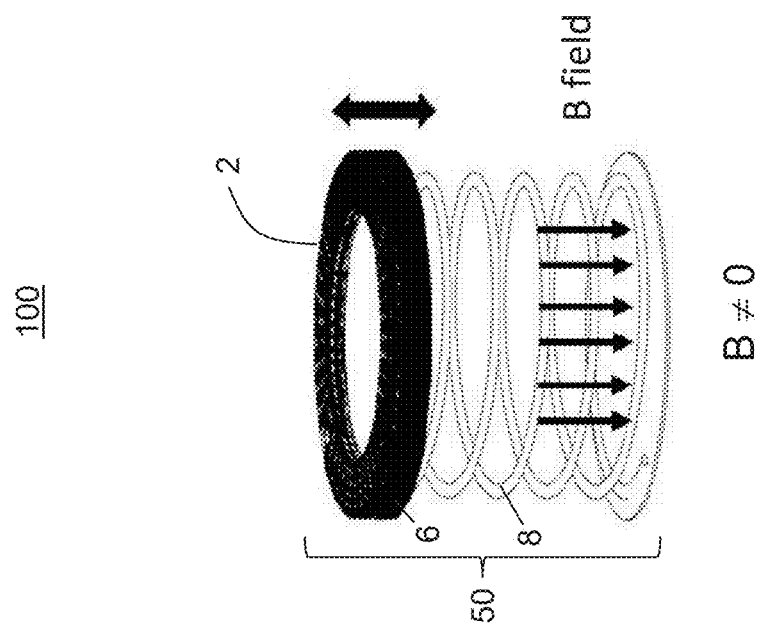
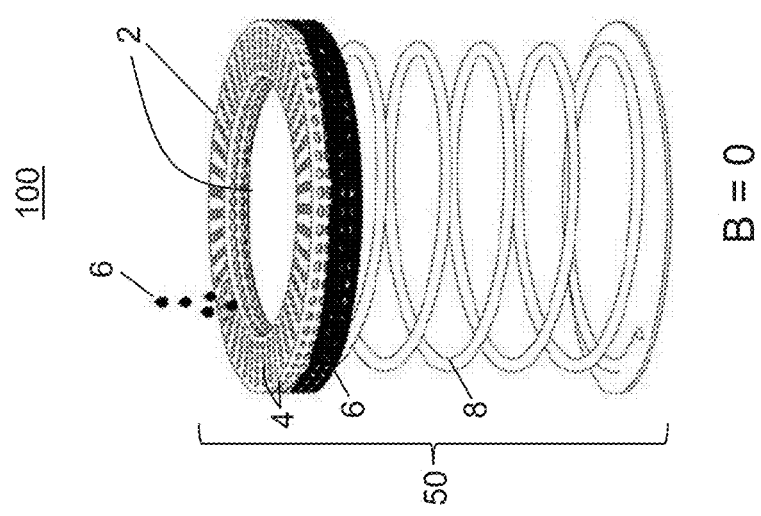
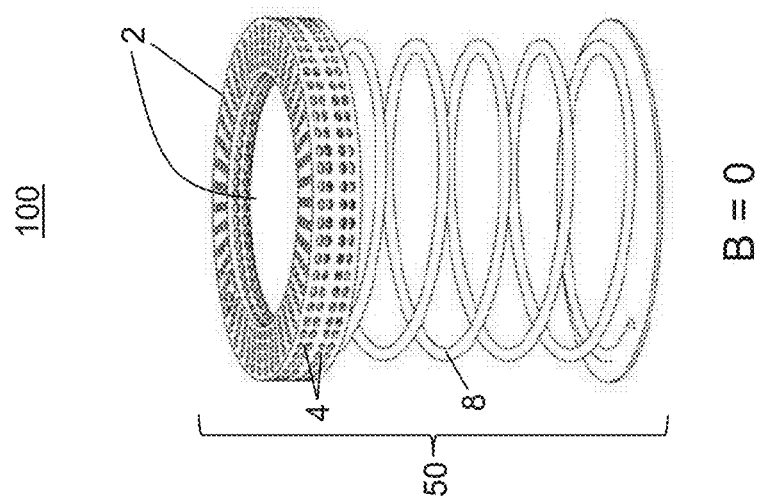

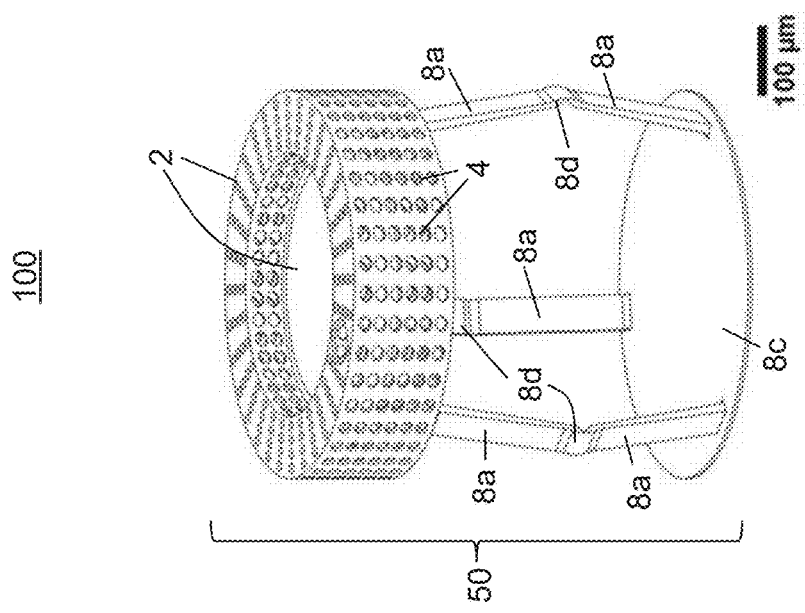
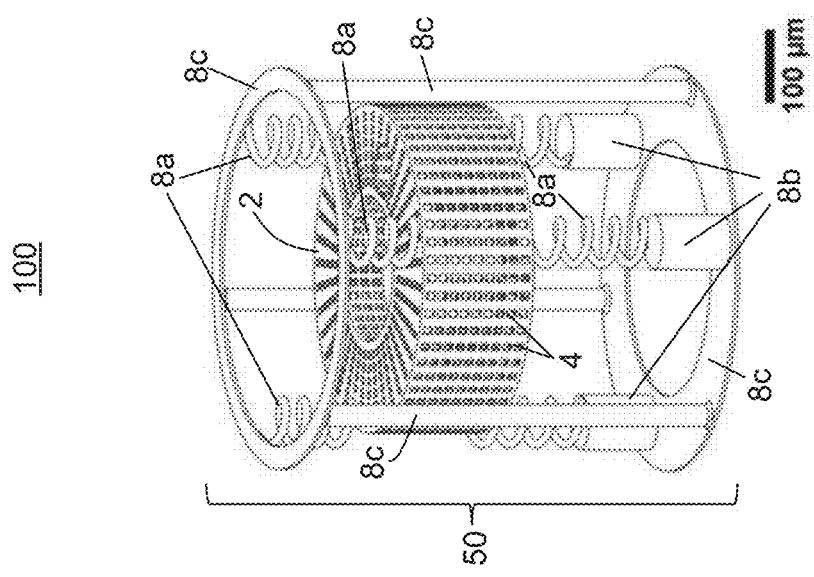
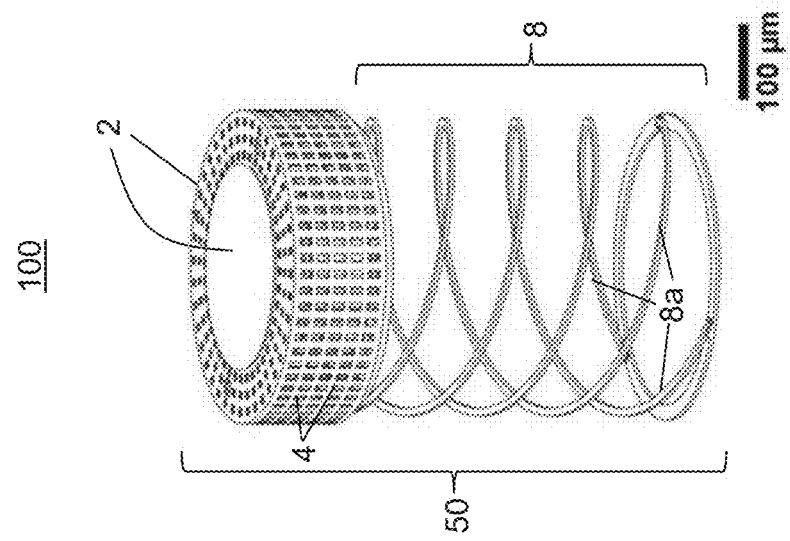

A-A

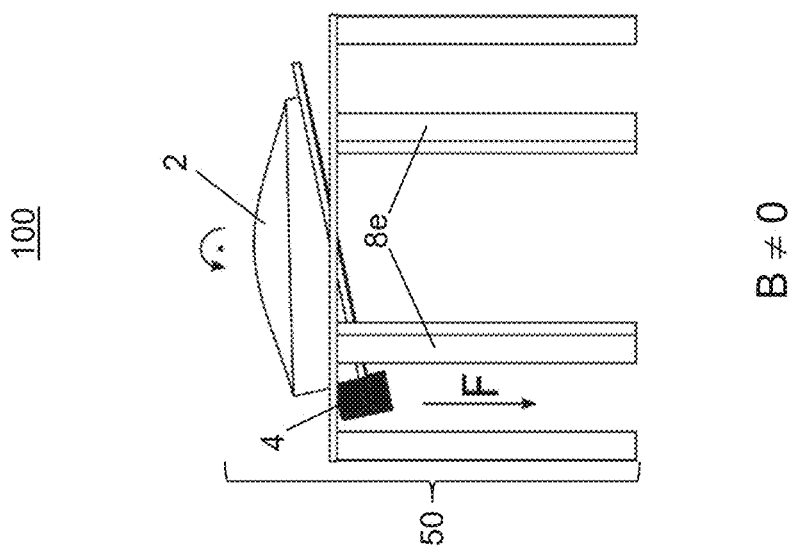
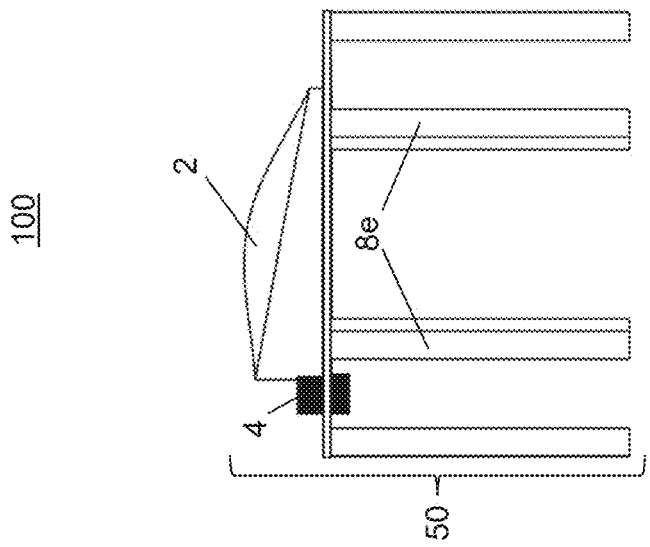
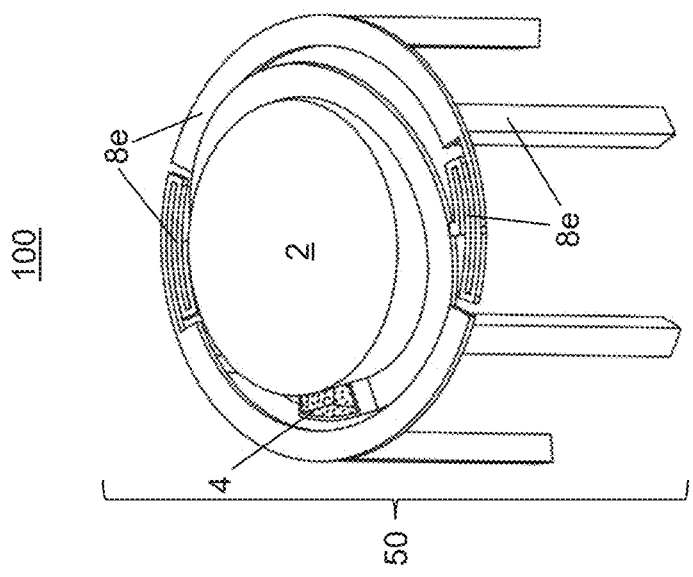

ACTUATABLE OPTICAL DEVICE, METHOD OF FABRICATING THE DEVICE, AND USE OF A MAGNETIC SUBSTANCE

CROSS-REFERENCE TO RELATED APPLICATIONS

This application claims priority to EP Appl. No. 20 1525 75.5, filed Jan. 20, 2020, the entire content of which is incorporated by reference herein.

DESCRIPTION

The invention relates to a 3D-printed actuatable optical device, in particular 3D-printed magnetically actuatable micro-optics, and a method of fabricating the actuatable optical device. The invention also relates to the use of a ferrofluid and/or a liquid magnetizable polymer for fabricating a magnetically actuatable optical device.

In recent years, additive manufacturing processes have established themselves as a suitable technology for producing optical elements or optical systems. 3D printers such as those produced by Nanoscribe GmbH, among others, make it possible to produce high-quality micro-optics. In this way, e.g. objectives with several lens elements can be printed on the sub-millimeter scale. Due to the uniform writing process, the lenses are already aligned with each other along an optical axis, and no additional adjustment steps are necessary.

Many macroscopic objectives have moving components. Thereby, objectives have the possibility, among others, to vary their focus or change their magnification (zoom systems). Movable components, such as adjustable lamellae, also allow for variable aperture diameters. Solutions for optical devices with movable optical components have so far only been available for optical components with a diameter greater than 1 mm. Due to unfavorable scaling effects, these solutions cannot readily be transferred to microscopic optical devices having optical components with a diameter of less than 1 mm or less than 500 µm. In particular 3D-printed micro-optics can e.g. have diameters in the range of only 100 µm. Due to these small dimensions, however, it is not possible to transfer conventional macroscopic drives to micro-lens systems. At the microscopic level (i.e. on the sub-millimeter scale), it is therefore a major technical challenge or obstacle to realize an optical device with movable components or, for example, to make entire lens groups of micro-objectives movable.

It is therefore an object of the present invention to provide an actuatable optical device that is efficient, compact and realizable in particular on the sub-millimeter scale (diameter less than 1 mm, preferably less than 500 µm). It is also an object of the present invention to provide a method of fabricating such an actuatable optical device. This object is achieved by the subject matters of the independent claims. Advantageous embodiments are subject of the subclaims.

A first independent aspect for solving the object relates to a method of fabricating an actuatable (or variable or active) optical device, comprising the steps of:
  forming a three-dimensional structure of the optical device with the aid of a 3D printer in such a way that the three-dimensional structure (50) has:
    at least one optical element, and
    at least one microfluidic cavity (4) for accommodating a magnetic substance (6);
  filling the at least one microfluidic cavity (4) with the magnetic substance (6).

An optical device can e.g. comprise a aperture, a single lens or a lens system. The optical device preferably has sizes or dimensions in the sub-millimeter range. In particular, the diameter of the at least one optical element of the optical device is less than 1 mm and preferably less than 500 µm. The optical device can therefore in particular be a microscopic optical device or micro-optics. Correspondingly, the at least one optical element can be a micro lens, a micro objective, a refractive or diffractive micro element, a micro mirror, a micro prism, a micro lens array, a micro total reflection structure and/or a microscopic meta-surface. In particular, the optical device can be a system of two or more lenses or micro lenses that are movable relative to one another. The optical device can e.g. also be a system of two optical components or optical elements (in particular lenses) that are to be aligned with one another.

In the context of this description, an optical element is generally understood to mean an element or component with specific or predetermined optical properties, such as a lens and/or a aperture etc. The optical element can have sizes or dimensions in the micrometer range, i.e. dimensions smaller than 1 mm, for example smaller than 500 µm and preferably smaller than 300 µm, and can therefore also be referred to as a micro-optical element. For example, a micro-optical element can have a diameter of approximately 10 µm to 500 µm, in particular approximately 120 µm, and a length of approximately 100 µm to 250 µm. In the context of this description, the optical element comprises in particular one or more of the following elements: a lens or a lens array, an objective, a aperture, a refractive element, a diffractive element, a mirror, a total reflection structure, a prism and/or a meta-surface.

Within the scope of the present invention, an "actuatable optical device" is understood to mean in particular a device with movable, adjustable, displaceable, alignable, tiltable and/or rotatable optical components or optical elements. An actuatable optical device is thus a variable optical device or a so-called active optical device. For example, a focal length and thus a magnification of the optical system or an aperture number can be varied or set. The optical device is thus a controllable optical device. In particular, the optical device or the at least one optical element of the optical device can be actuated or controlled with the aid of a magnetic field, so that it is a magnetically actuatable optical device. The magnetic field can be an externally applied magnetic field or a magnetic field generated by the optical device itself or by corresponding components of the optical device. The magnetic field is in particular an inhomogeneous magnetic field having a magnetic field gradient.

In a first step of the method according to the invention, a three-dimensional structure or basic or raw structure of the optical device is formed or printed with the aid of a 3D printer. A material optimally suitable for the respective 3D printer can advantageously be used to form this three-dimensional structure. In the case of a stereolithographic method, e.g. a transparent photoresist can be used to form the three-dimensional structure of the optical element. In the case of the 3D printer from Nanoscribe GmbH, the following photoresists can be used, for example: Nanoscribe IP-S, Nanoscribe IP-Dip, and/or Micro resist technology Ormo-Comp.

The three-dimensional structure can in particular be a microscale or micro-optical structure, i.e. a structure with dimensions in the micrometer range. The three-dimensional structure is preferably transparent.

The three-dimensional structure formed with the 3D printer has at least one microfluidic cavity suitable for accommodating a magnetic substance, in particular by utilizing capillary effects or by the action of capillary forces. In other words, the at least one microfluidic cavity is designed to accommodate a magnetic substance, in particular using a capillary effect or using capillary forces.

In the context of this description, a "microfluidic cavity" is understood to mean a void having such small dimensions that a fluid, in particular a liquid, behaves like a microfluid. A fluid or a liquid behaves like a microfluid when it is dominated by properties or effects, in particular capillary effects or capillary forces, upon contact with the microfluidic cavity or void, which can often be neglected in classical fluid mechanics. The at least one microfluidic cavity is preferably designed in such a way that it has a dimension or extension, i.e. a length and/or width, in particular a gap width, and/or a diameter, of less than 200 µm, preferably less than 150 µm, even more preferably less than 100 µm and most preferably less than 40 µm, especially less than 20 µm. For example, the at least one microfluidic cavity has a dimension or gap width of approximately 10 µm to 20 µm.

Advantageously, capillary effects on a size scale of less than 200 µm have a major influence and ensure that liquids are drawn directly into microfluidic cavities or voids with such dimensions to reduce surface energy.

In a second step, the at least one microfluidic cavity is filled with a magnetic substance. In the context of this description, the term "filling" includes partial or complete filling. In the case of partial filling, a bottom surface of the microfluidic cavity is covered or wetted with the magnetic substance, but the cavity or void is not completely filled with the magnetic substance. In particular, the at least one microfluidic cavity can be at least partially filled or only wetted. The microfluidic cavity can be filled e.g. with the aid of a high-precision inkjet printer ("inkjet printer") or a high-precision inkjet printing process, as is also used in semiconductor technology, e.g. to print conductor paths on circuit boards with conductive ink.

Filling the at least one microfluidic cavity preferably comprises bombarding the at least one microfluidic cavity with microdroplets of the magnetic substance. Filling is preferably carried out with the aid of a micropipette, the magnetic substance being drawn out of the micropipette into the cavity by the capillary force. In addition, a voltage can be applied to the magnetic substance via an electrode inserted in the pipette. This makes it easier to fill the cavity.

A "magnetic substance" is understood to mean a substance that can be influenced by a magnetic field or that reacts to a magnetic field. In particular, it is understood to mean a substance on which forces act when exposed to a magnetic field. In particular, the magnetic substance is a magnetizable substance. The magnetic substance preferably has a plurality of magnetic or magnetizable micro or nanoparticles. Due to its function, namely to generate forces in interaction with a magnetic field and thus to cause an actuation or movement of the at least one optical element, the magnetic substance can also be referred to as an actuation substance or a drive substance. The magnetic substance preferably has a magnetic initial susceptibility (in SI units) of at least 5, particularly preferably of at least 10, and most preferably of at least 20. As a result of a magnetic field that is conventionally available or can be generated for the purpose according to the invention (e.g. in the milli-tesla range), a sufficient force can be generated on the magnetic substance for actuating the optical device or the at least one optical element.

The three-dimensional structure is formed or printed with the aid of the 3D printer on the basis of a predetermined or specified layout or design. The layout or design is created using software belonging to the 3D printer and saved as a file. This file is finally sent to the 3D printer or made available to it, so that the 3D printer can form or print the desired structure on the basis of the file. The above-mentioned first step thus preferably comprises providing a layout or design of the optical element to be fabricated. Here, the layout includes at least one optical element, a microfluidic cavity and an actuating device.

The present invention enables extremely compact actuatable micro-optics that can be precisely and quickly controlled by an external magnetic field. The functionality of these components is significantly increased thereby. This makes zoom systems, swivel systems, focusable optics, compensator elements or variable apertures possible. These approaches can also be used for high-precision alignment, e.g. by aligning an optical component with high precision with respect to another component using an external magnetic field and gluing the two together as soon as they are perfectly aligned. One advantage of magnetic actuation is its simple implementation and the possibility to control the optical device without contact and also over a certain distance.

In a preferred embodiment, the magnetic substance comprises or is a ferrofluid. Alternatively or in addition, the magnetic substance comprises or is a liquid polymer that has or contains magnetic and/or magnetizable micro or nanoparticles.

Ferrofluids are colloidal suspensions of magnetic particles with a size of around 5-15 nm. In most commercial ferrofluids, the particles contained therein consist of magnetite ($Fe_3O_4$). These are dispersed in a carrier liquid. The concentration of the magnetic particles is usually in the range of 7-10%. Depending on the application, most varied carrier liquids are used for ferrofluids. Conventional carrier liquids are e.g. mineral oils, esters or, for medical applications, water. In order to avoid agglomeration of the magnetic particles, they can have a surface coating. Long-chain molecules (e.g. oleic acids) can e.g. be used for this, which, due to steric repulsion, ensure that the particles do not agglomerate. Ferrofluids contain ferromagnetic particles such as magnetite. Despite their small diameter, these particles have the same saturation magnetization, i.e. the same maximum magnetization of the material as in solid form. Due to the small diameter of the magnetic particles of approx. 10 nm, the number of Weiss domains per particle decreases or is limited to only one area. If a previously applied magnetic field is switched off, the particles lose their magnetization. This is due to the fact that the alignment of the particles is destroyed again due to thermal movements in the ferrofluid. Therefore, ferrofluids are categorized as superparamagnetic.

Application of an external magnetic field causes magnetic relaxation of the magnetic particles in the ferrofluid. In the case of alignment along a field gradient, magnetization of the ferrofluid occurs. The type of magnetization of the ferrofluids depends on the viscosity of the carrier material and the particle diameter. A force can be exerted on the ferrofluid by an external magnetic field. A crucial property of ferrofluids is that they are most strongly attracted to the region with the greatest intensity within a non-homogeneous magnetic field. Since the particles want to move into a state with the lowest energy, they follow the magnetic field and align themselves accordingly parallel to it. The force that acts on a single nanoparticle depends on its volume and the difference between the susceptibility of the particle and the susceptibility of the medium.

For example, the ferrofluid with the designation EMG 900 from FerroTec, which contains isoparaffin as a carrier substance and forms a colloidal suspension with magnetite particles, can be used for the present invention. It goes without saying that other ferrofluids, such as water-based ferrofluids, can be used as well. A water-based ferrofluid is e.g. the ferrofluid with the designation EMG 601P from FerroTec.

Alternatively or in addition to the ferrofluid, a liquid polymer filled with magnetic or magnetizable microparticles can be used as the magnetic substance. The liquid polymer can be cured after filling, e.g. by using UV light or by application of heat. For example, low-viscosity 2-component epoxy resins and/or low-viscosity photopolymers can be used for this purpose. The use of a liquid polymer filled with magnetic or magnetizable microparticles offers the possibility of aligning the particles in an external magnetic field before curing, so that a permanent magnet is created upon solidification of the substance. Alternatively, there is the possibility of magnetizing particles in a strong external magnetic field after solidification of the liquid substance.

In a further preferred embodiment, the three-dimensional structure of the optical device furthermore has an actuating device (also referred to as an actuator element or actuator) for positioning the at least one optical element. In the context of the invention, "positioning" is understood to mean that the at least one optical element is brought into a specific position or posture or alignment. In other words, the actuating device serves to actuate, i.e. move (in particular shift, tilt and/or rotate) the at least one optical element. In the context of the present invention, the term "positioning" therefore not only includes translational displacement, but also alignment, i.e. turning or tilting. Due to its function, namely to position or align the at least one optical element, the actuating device can also be referred to as an actuator element.

The at least one optical element, the at least one microfluidic cavity and the at least one actuating device are preferably mechanically connected to one another. In particular, the at least one optical element is mechanically connected to the at least one microfluidic cavity and/or to the at least one actuating device. Alternatively or in addition, the at least one actuating device can be mechanically connected to the at least one microfluidic cavity.

In a further preferred embodiment, the actuating device and the microfluidic cavity are designed and arranged to bring, as a result of an interaction of the magnetic substance with an applied magnetic field, the at least one optical element into an actuating position dependent on the magnetic field. The term "actuating position" means in particular a position (e.g. coordinates) and/or a posture or alignment (e.g. tilting) of the at least one optical element.

In a further preferred embodiment, the at least one microfluidic cavity is part of the at least one optical element. In other words, the at least one microfluidic cavity is integrated into the at least one optical element or is formed therein. For example, the optical element can comprise a lens and a lens holder. The microfluidic cavity can e.g. be formed in the lens holder. In particular, each optical element can have an associated microfluidic cavity, and each microfluidic cavity can be part of the optical element associated with the respective microfluidic cavity.

In a further preferred embodiment, the at least one actuating device comprises or is a spring element and/or a suspension element (mounting and/or attachment element). In the case of a spring element, the spring element is preferably mechanically connected to the at least one optical element and/or to the at least one microfluidic cavity. In the case of a suspension element, the at least one optical element is arranged, suspended or supported on the suspension element such that it is rotatable or tiltable. Furthermore, the at least one microfluidic cavity is preferably mechanically connected to the suspension element. The actuating device is in particular a resilient element, i.e. the actuating device returns to its initial position when a force deflecting the actuating device (in particular caused by a magnetic field) ceases. In particular, the actuating device comprises or is an elastic spring element and/or a resilient suspension. In this way, it is possible to bring the at least one optical element into a desired position or alignment by applying a specific magnetic field or magnetic flux.

In a further preferred embodiment, the at least one optical element, the at least one microfluidic cavity and the at least one actuating device are 3D printed in a single process step. The optical device can thus be manufactured efficiently, cost-effectively and precisely.

In a further preferred embodiment, the three-dimensional structure is printed on an end or an end portion (i.e. on an end face or tip) of a fiber or a fiber bundle. The fiber is preferably an optical fiber, in particular a glass fiber or, preferably, the fiber bundle is an optical fiber bundle, in particular a glass fiber bundle. In addition to any optical properties, the fibers can advantageously also serve as a magnetic core for wrapping with coil wire and thus enable a highly integrated system.

In a further preferred embodiment, the three-dimensional structure also has a microcoil. The microcoil is preferably arranged in such a way that it encloses the fiber or the fiber bundle at least in some part(s). The coil can advantageously be used to generate the magnetic field with which the actuation of the at least one optical element can be monitored or controlled. The fiber wrapped by the spool or the fiber bundle wrapped by the spool (in particular its end portion on which the three-dimensional structure is printed) can, as already mentioned above, additionally serve as a magnetic core.

In a further preferred embodiment, the three-dimensional structure also has a magnetizable sleeve or hull, i.e. a sleeve made of magnetizable material. The magnetizable sleeve can be made from iron, nickel, cobalt and/or a suitable alloy (e.g. from rare earths). The magnetizable sleeve is preferably arranged in such a way that it encloses the fiber or the fiber bundle at least in some part(s). The microcoil is also preferably arranged in such a way that it encloses the magnetizable sleeve at least in some part(s). In other words, the magnetizable sleeve is arranged at least in some part(s) between the fiber or the fiber bundle and the microcoil. The sleeve serves to homogenize and/or increase the magnetic field strength of the coil.

In a further preferred embodiment, the three-dimensional structure has at least two optical elements, e.g., lenses. In particular, two lenses movable independently of one another, preferably one above the other or one inside the other, are arranged in such a way that they perform different movements as a result of differently strong spring constants of the respective associated actuating devices and/or as a result of different sizes or shapes of associated microfluidic cavities in the (same) magnetic field. In this way, a change in focal length can be realized without the position of the image plane changing (zoom system).

In a further preferred embodiment, the three-dimensional structure has at least two actuating devices or spring elements with different spring constants. In particular, the three-dimensional structure can have an associated spring element for each optical element, so that the number of optical elements corresponds to the number of actuating devices or spring elements. Each optical element is preferably mechanically connected to an associated actuating device or an associated spring element. Due to the different spring constants of the actuating devices or spring elements, the optical elements can be moved differently. Consequently, a specific magnetic field causes different deflections of the optical elements. The optical elements thus perform different movements in an applied magnetic field. For example, a zoom system can be realized in this way.

In a further preferred embodiment, the three-dimensional structure has at least two microfluidic cavities of different sizes (length, width, height, diameter) and/or shape and/or volumes. In particular, the three-dimensional structure can have an associated microfluidic cavity for each optical element, so that the number of optical elements corresponds to the number of microfluidic cavities. Each optical element is preferably mechanically connected to a microfluidic cavity. Due to the different size and/or shape and/or volumes of the microfluidic cavities, the optical elements can be moved differently. Consequently, a certain magnetic field causes different forces on the magnetic substance located in the different cavities. The optical elements thus perform different movements in an applied magnetic field. For example, a zoom system can be realized in this way.

It is also possible to combine the features described above so that, for example, the three-dimensional structure has an associated actuating device and an associated microfluidic cavity for each optical element, the actuating devices each having different spring constants and the microfluidic cavities having different sizes and/or shapes and/or or have volumes.

In a further preferred embodiment, the three-dimensional structure also has at least one guiding or guide element for guided or directed actuation (i.e. positioning and/or alignment, in particular movement, displacement, tilting and/or rotation) of the at least one optical element, in particular in the actuating position. With the help of the guide element, the optical device is less susceptible to inaccuracies in the gradient of the applied magnetic field.

In a further preferred embodiment, the three-dimensional structure of the optical device is produced or formed using a 3D lithography system, in particular using a 3D laser lithography system or a 3D multi-photon laser lithography system, which is preferably based on two-photon polymerization of a UV-curing photoresist.

In a further preferred embodiment, the method further comprises curing the magnetic substance or liquid. This can be done depending on the respective magnetic substance e.g. by heating or cooling and/or by illuminating the magnetic substance, for example with UV light. In particular, the curing process can be accelerated thereby. As an alternative or in addition, the method further comprises drying or allowing the magnetic substance or liquid to dry out. Drying can be done, for example, simply by waiting and/or by heating and/or lighting and/or blow-drying. It is also possible that the magnetic substance only receives or makes available the desired functionality through curing and/or drying.

Another independent aspect for solving the object relates to an actuatable optical device comprising a three-dimensional structure produced or fabricated with a 3D printer, the three-dimensional structure having:
at least one optical element, and
at least one microfluidic cavity (4) filled with a magnetic substance (6).

In a preferred embodiment, the three-dimensional structure also has:
at least one actuating device for positioning the at least one optical element.

In particular, the at least one optical element can be actuated with the aid of the at least one microfluidic cavity filled (with a magnetic substance) and the at least one actuating device via a magnetic field or as a function of a magnetic field.

The three-dimensional structure is formed or printed using a 3D printing technique, i.e. using a 3D printer or a 3D printing method. The 3D printer or the 3D printing method is preferably a 3D lithography system or 3D lithography process and in particular a 3D laser lithography system or a 3D laser lithography process. An example of a 3D printer or a 3D printing system is the commercially available 3D laser lithography system "Photonic Professional GT™" from Nanoscribe GmbH, which is based on two-photon polymerization of a UV-curing photoresist. However, it goes without saying that, in principle, other 3D printers or other 3D printing processes can also be used.

The at least one microfluidic cavity is preferably designed or formed (i.e. has such small sizes or dimensions) to receive or such that the magnetic substance can be received using capillary effects or the action of capillary forces.

The actuatable optical device can further comprise means for generating a magnetic field, for example an electromagnet controlled by a microcontroller. In particular, the microcontroller can also be part of the actuatable optical device. Correspondingly, the above-described method of fabricating the actuatable optical device can comprise providing means for generating a magnetic field, in particular providing an electromagnet controlled by a microcontroller.

Another independent aspect of solving the object relates to the use of a magnetic substance, in particular a magnetizable fluid, for realizing or fabricating a magnetically actuatable optical device, the optical device having a three-dimensional (i.e. 3D-printed) structure with at least one optical element and at least one microfluidic cavity, the three-dimensional structure being formed with the aid of a 3D printer, and wherein the magnetic substance is filled into the at least one microfluidic cavity. In particular, the magnetic substance comprises or is a ferrofluid and/or a liquid magnetizable polymer.

The statements made above or below regarding the embodiments of the first aspect also apply to the above-mentioned further independent aspects and in particular to preferred embodiments in this respect. In particular, the statements made above and below regarding the embodiments of the respective other aspects also apply to an independent aspect of the present invention and to preferred embodiments in this respect.

In the following, individual embodiments for solving the object will be described by way of example using the figures. Here, the individual embodiments described partly include features that are not absolutely necessary for implementing the claimed subject matter, but that provide desired properties in certain applications. Thus, embodiments that do not include all the features of the embodiments described below are also to be regarded as being disclosed falling under the technical teaching described. Furthermore, in order to avoid unnecessary repetition, certain features are only mentioned in relation to individual embodiments described below. It is pointed out that the individual embodiments should therefore not only be considered individually, but also be considered in combination. On the basis of this combination, the skilled person will recognize that individual embodiments can also be modified by including individual or multiple features of other embodiments. It is pointed out that a systematic combination of the individual embodiments with one or more features described in relation to other embodiments can be desirable and sensible and should therefore be considered and should also be regarded as encompassed by the description.

BRIEF DESCRIPTION OF THE DRAWINGS

FIG. 2a shows a snapshot without a magnetic field applied and FIG. 2b shows a snapshot with a magnetic field applied.

FIGS. 3a-3c show an elementary schematic sketch of an actuatable optical device and its filling with a magnetic substance according to a preferred embodiment of the invention; FIG. 3a shows an actuatable optical device without filling, FIG. 3b shows the filling process, and FIG. 3c shows the actuatable optical device with filling under the influence of a magnetic field applied.

FIG. 4a shows a schematic drawing of an actuatable optical device according to an exemplary embodiment of the invention;

FIG. 4b shows a schematic drawing of an actuatable optical device according to a further exemplary embodiment of the invention;

FIG. 4c shows a schematic drawing of an actuatable optical device according to a further exemplary embodiment of the invention.

FIGS. 7a-7c show schematic drawings of an actuatable optical device according to a further exemplary embodiment of the invention. FIG. 7a shows the optical device in a perspective top view, while FIGS. 7b and 7c show the optical device for B=0 and B≠0 in a side view.

DETAILED DESCRIPTION OF THE DRAWINGS

Figure 1:
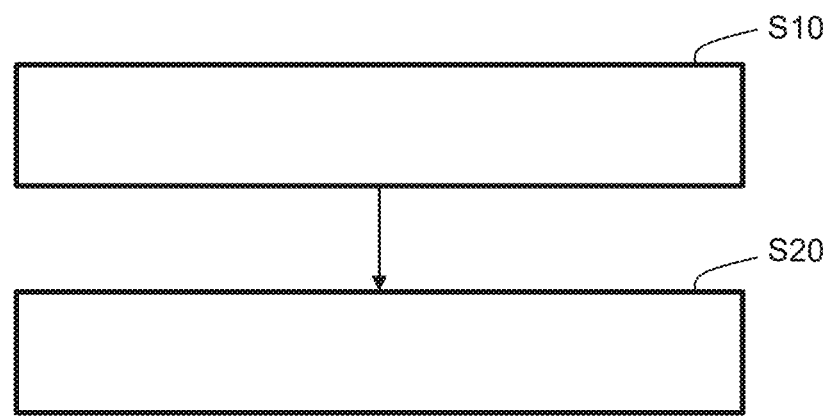
FIG. 1 shows a schematic flow diagram of the method according to the invention according to a preferred embodiment.

FIG. 1 shows a schematic flow diagram of the method according to the invention for fabricating an actuatable optical device according to a preferred embodiment. The method comprises step S10, namely forming a three-dimensional structure of the optical device with the aid of a 3D printer. The three-dimensional structure is designed and printed in such a way that the three-dimensional structure has at least one optical element, such as a aperture, a lens, a lens system or an objective, and at least one microfluidic cavity, i.e. at least one void, for receiving a magnetic substance. In a further step S20, the method comprises filling the at least one microfluidic cavity with the magnetic substance. Filling can take place in particular using a high-precision inkjet printer, with which liquids can be dispensed with an accuracy of 0.1 femtoliter to 10 picolitre. In this way, it is possible to integrate magnetizable material such as ferrofluids into micro-optical systems. For example, a high-precision inkjet printer from the company "SIJ Technology Corp." can be used for this. It is usually used in semiconductor technology, for example to print conductor paths on circuit boards with conductive ink. For the controlled delivery of the fluid, the inkjet printer is equipped with a micropipette filled with ferrofluid. Due to the high-precision control of the micropipette with regard to the movement path and the delivery of the fluid volume, the inkjet printer is also suitable within the scope of the present invention, namely to fill microstructures with a diameter of less than 500 μm with fluids.

The magnetic substance, in particular a magnetizable fluid, comprises micro or nanoparticles made of magnetizable material. Because of the small cross-sectional area of the cavities <200 μm, capillary forces dominate in the system. The capillary forces favor that the fluids mixed with magnetic particles are sucked into the cavity. By introducing magnetic material into the 3D-printed components, they react to external magnetic fields with an actuating force. The magnetic field can advantageously be generated at a greater distance or in the immediate vicinity of the optical components. If, for example, a so-called ferrofluid is used for filling, magnetic relaxation of the magnetic particles occurs when an external magnetic field is applied. Upon alignment along a field gradient, the ferrofluid is magnetized and a force is generated.

Usually, liquids do not have any magnetic properties. Conventional liquids mostly only have paramagnetic properties with a very low susceptibility. Because of this low susceptibility, the reaction of conventional liquids is only weak even with strong magnetic fields. A magnetic control of these fluids via an external magnetic field, e.g. to change the direction of flow of the fluid, is therefore not possible. However, this is possible with the help of ferrofluids, which were discovered in the 1960s. So far, ferrofluids have been used e.g. to seal shafts but also to combat cancer in medicine. Ferrofluids are colloidal suspensions of magnetic particles with a size of around 5-15 nm. In most commercial ferrofluids, the particles contained therein consist of magnetite. They are dispersed in a carrier liquid. The concentration of the magnetic particles is usually in the range from 7% to 10%. Depending on the application, most varied carrier liquids are used for ferrofluids. Conventional carrier liquids are e.g. mineral oils, esters or, for medical applications, water. In order to avoid agglomeration of the magnetic particles, they can have a surface coating. Long-chain molecules (e.g. oleic acids) are usually used for this, which, due to steric repulsion, ensure that the particles do not agglomerate.

As an alternative to the ferrofluid, a liquid polymer filled with magnetic or magnetizable microparticles, i.e. a liquid magnetizable polymer, can be used for the present invention, which is cured after filling, e.g. by using UV light or by application of heat. This approach additionally offers the possibility of aligning the particles in an external magnetic field before curing, so that a permanent magnet is created upon solidification of the substance. Alternatively, there is the possibility of magnetizing particles in a strong external magnetic field after solidification of the liquid substance.

Figure 2A:
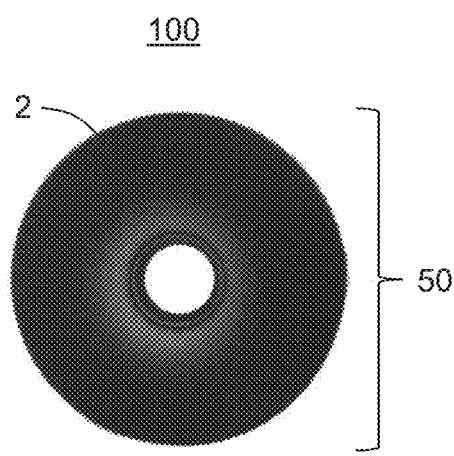
FIGS. 2a-2b show a microscopic image of an actuatable optical device according to an exemplary embodiment of the present invention.
Figure 2B:
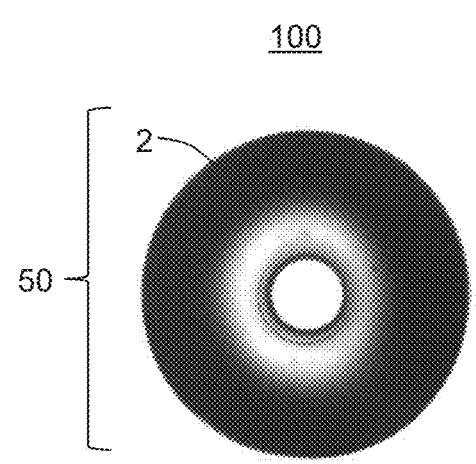

FIGS. 2a and 2b show a microscopic image of an actuatable optical device 100 according to an exemplary embodiment of the present invention. In the example in FIGS. 2a-2b, the actuatable optical device 100 has a three-dimensional structure 50 with an optical element 2. In this exemplary embodiment, the optical element 2 is a variable aperture. The variable aperture is realized by a magnetic substance. The magnetic substance (shown as a black area in FIGS. 2a and 2b) is compressed under the influence of a magnetic field B. While FIG. 2a shows a snapshot of the variable aperture without a magnetic field B applied, FIG. 2b shows a snapshot of the variable aperture with a magnetic field B applied. The optical element 2, i.e. the aperture, is a simple shell with a circular opening, which can be printed using two-photon lithography and then filled with a magnetic substance, in particular a ferrofluid. As can be seen in FIGS. 2a and 2b, the ferrofluid is compressed in the edge region of the shell under the influence of a magnetic field, which effectively increases the aperture.

FIGS. 3a-3c show an elementary schematic sketch of an actuatable optical device 100 and its filling with a magnetic substance 6 according to a preferred embodiment of the invention. FIG. 3a shows the actuatable optical device 100 without filling. The actuatable optical device 100 comprises a 3D-printed three-dimensional structure 50, which has an optical element 2 (for example a lens, shown in FIGS. 3a-3c only by a circular opening), a microfluidic cavity 4 accessible from the outside via a plurality of bores, and an actuating device 8. The actuating device 8 is a spring or a spiral spring in this exemplary illustration. FIG. 3b schematically shows the filling process with the magnetic substance 6. The magnetic substance 6 is filled into the microfluidic cavity 4. FIG. 3c shows the actuatable optical device 100, in the cavity 4 of which the magnetic substance has been filled completely, specifically under the influence of an externally applied magnetic field B. Without a magnetic field (FIGS. 3a and 3b), the spring is in a relaxed state. By application of a magnetic field, a force acts on the magnetic substance, so that the cavity 4 and thus also the optical element 2 are moved along the spring axis. In doing so, the spring is compressed and in turn exerts a mechanical force that is opposite to the magnetic force. In this way, the optical element 2, depending on the magnetic field applied, can be brought into a very specific actuating position, namely into a position in which there is an equilibrium of forces. After the magnetic field has been switched off, the optical element 2 returns to its starting position as a result of the restoring force of the spring. Thus, for example, a bidirectional movement of micro-optics along their optical axis can be achieved. A translational movement can thus be achieved via magnetic attraction and repulsion as a function of a magnetic field applied. After the magnetic field has been switched off, a restoring force can be provided, via a spring element as in the case described here. In this way, individual lenses, lens groups or other functional elements can be moved in a 3D-printed microsystem. The spring geometries for generating the restoring force are 3D printed in the same step as the cavities and the lenses.

According to the exemplary embodiment in FIGS. 3a-3c, the optical element 2 can be a single microlens with a cavity 4 around an edge cylinder of the microlens. The actuating device 8 or the spring is mechanically connected directly to the cavity. When two-photon lithography is used for manufacturing, a development step is necessary after the writing process of the structures. In the development process, the uncured polymer is washed away. The patterned bores of the cavity 4 advantageously make it possible to detach uncured polymer residues from the interior of the cavity 4 during the development process.

FIGS. 4a-4c show three exemplary embodiments of an actuatable optical device 100 according to the invention. The exemplary designs shown in FIGS. 4a-4c all include a single lens embedded in a cavity 4. FIG. 4a shows a three-dimensional structure 50 having three spring elements 8a rotated by 120° as the actuating device 8. In this way, a force transmission as uniform as possible between the actuating element 8 and the microlens 2 including the cavity 4 can be made possible. In addition, it can be ensured that a reproducible axial movement is guaranteed. FIG. 4b shows an embodiment of the three-dimensional structure 50 with three spring elements 8a connected in series, which are each arranged on an associated spring element support 8b. In addition, the actuating device 8 comprises an additional actuating device frame 8c. FIG. 4c shows an embodiment of the three-dimensional structure 50 with thin spring beams 8a that can be moved via film hinges 8c.

Figure 5A:
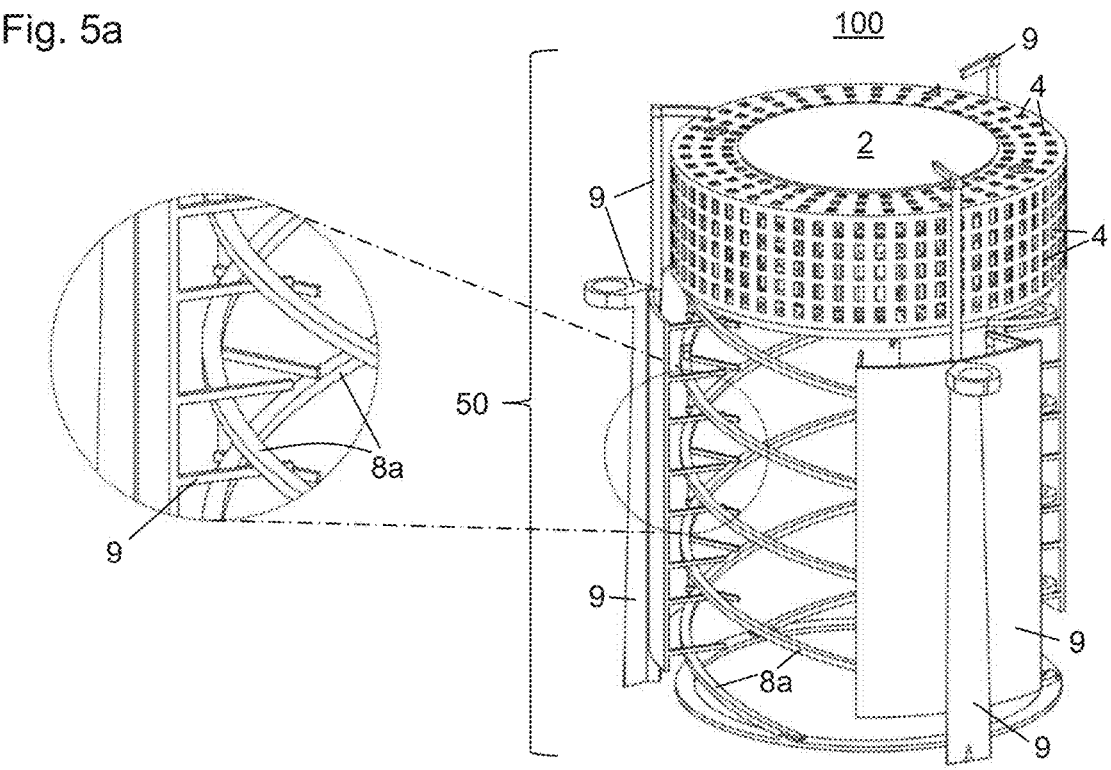
FIGS. 5a-5c show schematic drawings of an actuatable optical device according to a further exemplary embodiment of the invention in different views.
Figure 5B:
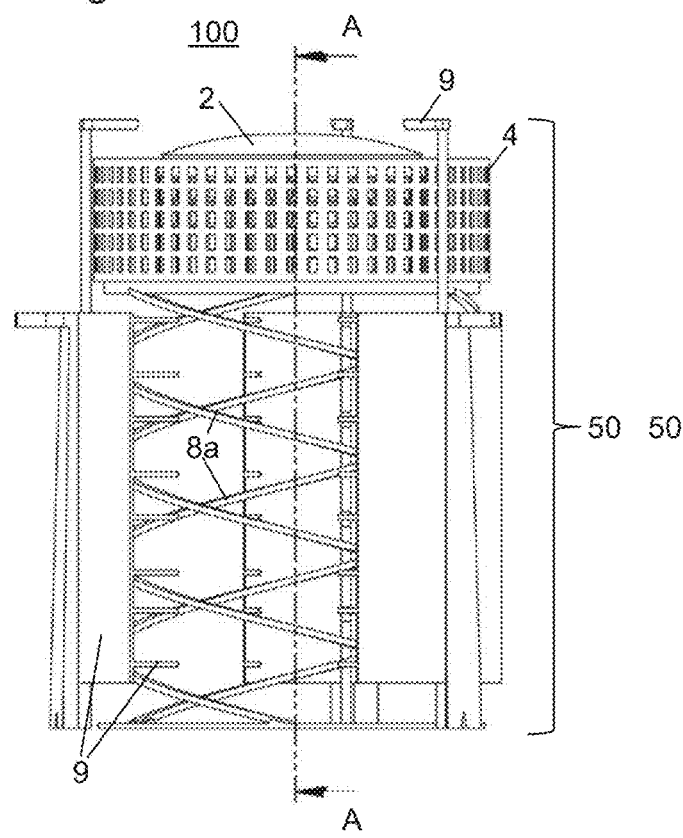
Figure 5C:
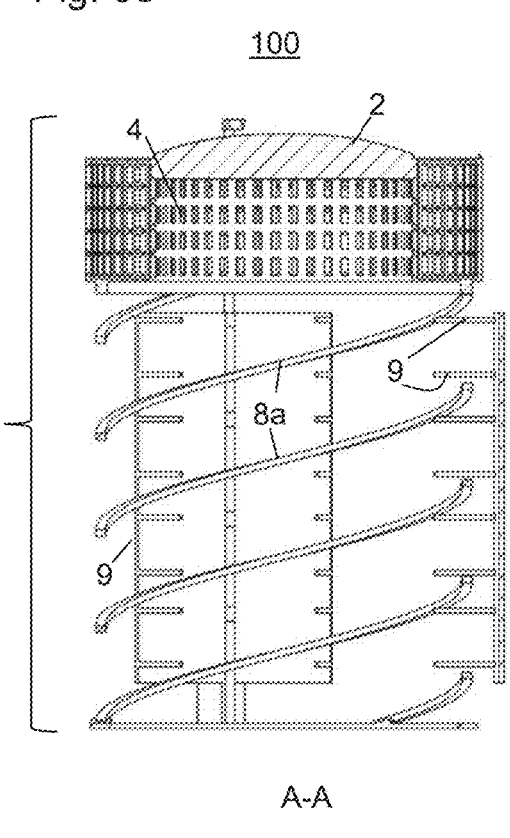

FIGS. 5a-5c show schematic drawings of an actuatable optical device 100 according to a further exemplary embodiment of the invention, the optical device 100 being shown in different views in FIGS. 5a, 5b and 5c. In addition to the optical element 2 (lens), the microfluidic cavity 4 and the spring elements 8a, the three-dimensional structure 50 also has a support structure or support structures 9. This support structure ensures that the spring turns do not stick together during the writing process and developing due to wetting effects. If the distance between the support combs and the spring turns is too small, these would be polymerized to one another and removal of the supports would not be possible anymore. After the development, the support structure 9 can be removed again. The support structure 9 can also be removed, for example, with the inkjet printer, in particular with a micropipette installed on the inkjet printer. As a result of the high-precision control of the micropipette, the support structure 9 can be removed in a simple manner while being observed through a microscope.

Figure 6A:
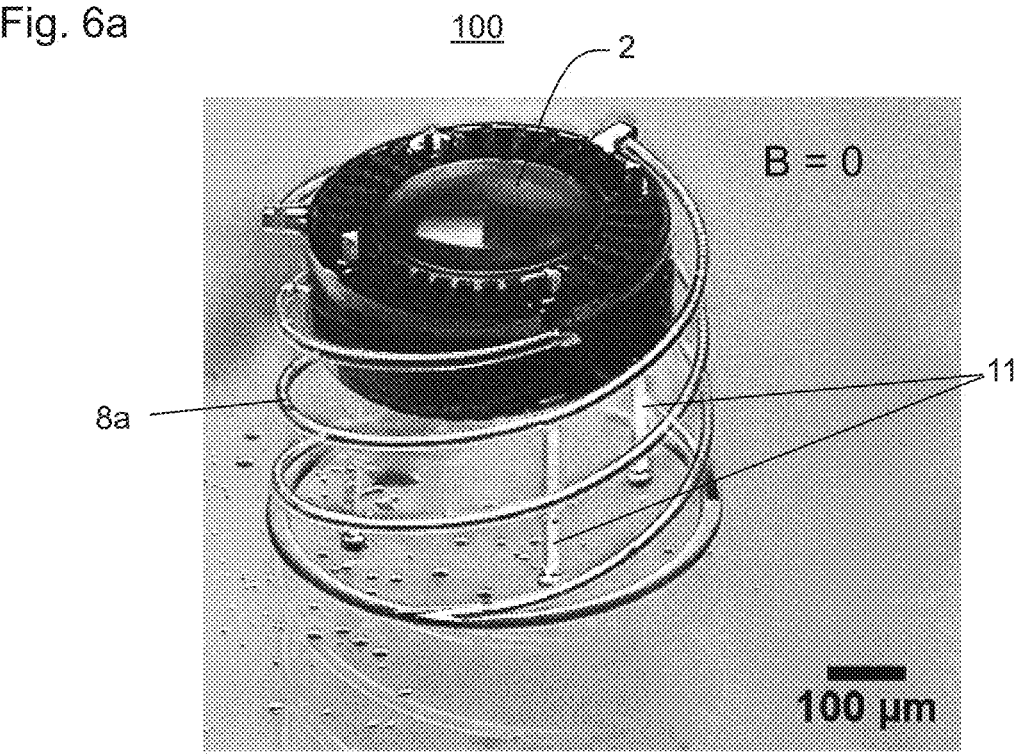
FIG. 6a shows a microscopic image of an actuatable optical device according to an exemplary embodiment of the invention without a magnetic field applied.
Figure 6B:
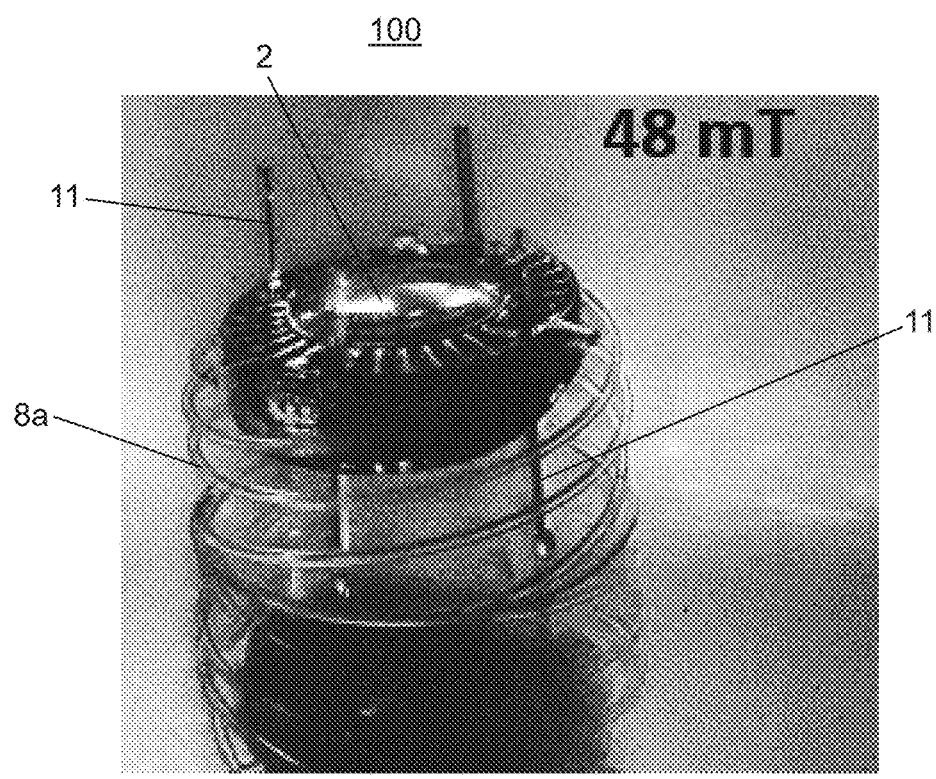
FIG. 6b shows a microscopic image of the actuatable optical device of FIG. 6a under the influence of a magnetic field applied.

FIGS. 6a-6b show microscopic images or photos of an actuatable optical device 100 produced with the method according to the invention. The design of the three-dimensional structure 50 is based on the design shown schematically in FIG. 4a and comprises a lens 2 embedded in a cavity 4 filled with a magnetic substance, as well as three spring elements 8a offset by 120°. In addition, the three-dimensional structure 50 of the optical device 100 has guide elements 11 ensuring a directed movement of the optical element 2 or the lens. In this respect, FIGS. 6a-6b show an experimental implementation of a variant with guide elements 11 arranged within a volume enclosed by the spring elements 8a. The guide elements 11 can e.g. comprise or be beams with a triangular profile. With such a triangular profile, an axial movement with only a small contact surface can advantageously be achieved. For example, the three-dimensional structure 50 can have one or two, preferably three, four or more guide elements. FIG. 6a shows a microscopic image of the actuatable optical device 100 without magnetic field applied, and FIG. 6b shows a microscopic image of the actuatable optical device 100 under the influence of a magnetic field applied, with B=48 mT. As can be seen from the images, the spring elements 8a in FIG. 6b are compressed and the optical element 2 has assumed a different position compared to FIG. 6a. On the basis of or as a function of the magnetic field, the optical device 100 can thus be actuated or the optical element 2 can be moved.

FIGS. 7a-7c show schematic drawings of an actuatable optical device 100 according to a further exemplary embodiment of the invention. In this case, FIG. 7a shows the optical device 100 in a perspective top view, while FIGS. 7b and 7c show the optical device 100 in a side view, respectively for B=0 and B≠0. In the exemplary embodiment in FIGS. 7a-7c, the actuating device 8 comprises or is a suspension or a suspension element 8e. In addition to translatory movements, e.g. along the optical axis of a lens system, tilting movements are possible as well. With such tilting movements, for example, it is possible to realize systems that can scan an area in the image or object space or dynamically expand the field of view of imaging optics.

FIGS. 7a-7c illustrate such a 3D-printed, magnetically tiltable optic. A cavity 4 (black) laterally attached to the optical element 2 reacts to external magnetic fields with a directed force F after being filled with magnetic material (see FIG. 7c). Due to the suspension of the lens, this causes a torque and enables elastic or resilient tilting of the optics. In particular, for this purpose, the suspension 8e can have elastic or resilient spring elements.

Figure 8A:
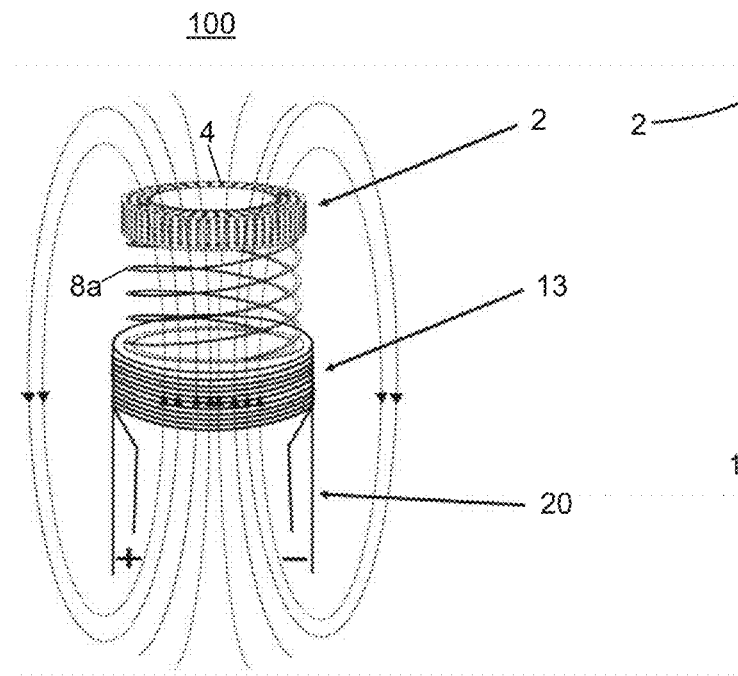
FIG. 8a shows a schematic drawing of an actuatable optical device according to a further exemplary embodiment of the invention.
Figure 8B:
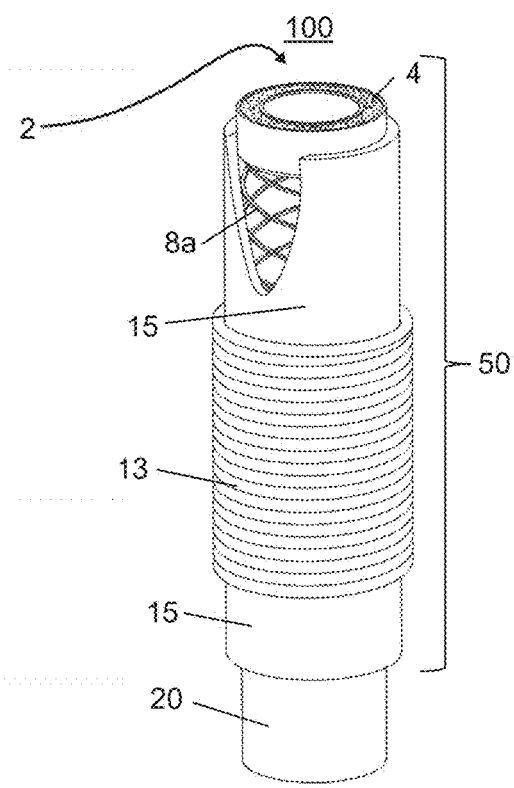
FIG. 8b shows a schematic drawing of an actuatable optical device according to a further exemplary embodiment of the invention.
Figure 8C:
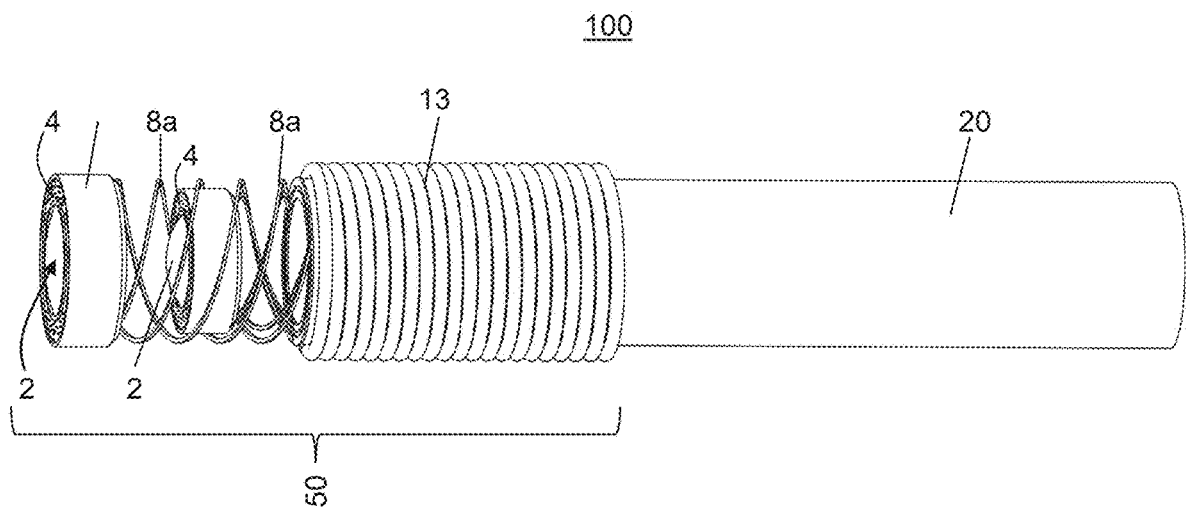
FIG. 8c shows a schematic drawing of an actuatable optical device according to a further exemplary embodiment of the invention.

FIGS. 8a-8c show schematic drawings of a magnetically actuatable optical device 100 according to further exemplary embodiments of the invention. These embodiments have in common that the optical device 100 or the three-dimensional structure 50 is arranged on the end or the facet of a glass fiber 20 (or a fiber bundle) or was printed directly onto the glass fiber 20 or a fiber bundle. This is made possible by the overall compact design and the manufacturing process.

The fibers 20 can at the same time also serve as a core for wrapping with coil wire or for a microcoil 13 and thus enable a highly integrated system, as is shown schematically in FIG. 8a. The microcoil 13 can also be 3D printed as part of the three-dimensional structure 50. The microcoil 13 can have electrical connections (shown with + and − in FIG. 8a) for applying a voltage in order to induce a magnetic field by a corresponding current flow through the coil 13. An energy source required for this, for example a power supply unit or a battery or a rechargeable battery, can also be part of the actuatable optical device 100.

In order to strengthen and homogenize the magnetic field, it can be advantageous to integrate a sleeve 15 made of magnetizable material within the coil 13, as is shown schematically in FIG. 8b. The magnetizable sleeve 15 can also be 3D printed as part of the three-dimensional structure 50. Alternatively, the magnetizable sleeve 15 can be pushed over the fiber 20 as a prefabricated component and can be fixed. The magnetizable sleeve 15 is arranged in such a way that it surrounds the actuating device 8 or the spring elements 8a at least in some part(s). Furthermore, the sleeve 15 also surrounds the fiber bundle 20 in some part(s). The microcoil 13 is arranged in such a way that it surrounds the sleeve 15. The fiber or the fiber bundle 20 can thus also be part of the actuatable optical device 100 in addition to the 3D-printed three-dimensional structure 50.

The systems described above can now be combined in further variants. For example, it is possible to arrange two separately movable optical elements 2 (e.g. lenses) one above the other or one inside one another, as shown schematically in FIG. 8c, in order to provide them with differently strong spring constants and/or differently sized cavities. In this way, the optical elements 2 perform different movements in the same magnetic field. This makes it possible, for example, to change the focal length without changing the position of the image plane (zoom system).

The present invention could open up new fields of application in medical endoscopy or technical inspection, for example. By the possibility of actively focusing micro-optics it would be possible, for example, to produce lenses with a large aperture and a shallow depth of field. By quickly moving the focus and capturing several images, these could be combined using image processing software and thus an image with yet a large depth of field could be created. By a large aperture or increased light intensity of the objective, the resolution of the optics can be increased and the surgeon can yet be provided with a permanently sharp image by means of image processing. It would make sense to print the optics directly onto an image sensor, since a much greater resolution can be achieved with an image sensor than with a glass fiber bundle.

Moreover, it would be conceivable to realize a micro-zoom system based on the present invention. This could e.g. be realized by several lens groups, which are attached to springs with spring turns of different thicknesses. In this way, one could obtain non-linear movements paths, as they are required in zoom systems. In the case of spring turns of different thicknesses, the soft areas would first be compressed until they lie completely on top of one another. Then the harder areas are compressed. Thereby, an adaptation of the movement path of different lens groups is conceivable.

In the case of a pivoting system or a system in which the optics are moved laterally to the image plane, approaches for increasing resolution through superposition could also be implemented with the aid of the present invention. This is particularly relevant when fiber bundles are used for imaging. Their pixelation usually leads to a loss of information and resolution. By slightly shifting and/or tilting the optics, the image plane can be moved over the fiber facet in a known manner, which enables the pixelation to be calculated out and corresponding gaps in the image space to be filled.

It goes without saying that designs other than those described above by way of example are also possible. The designs can easily be created with a CAD program and then implemented with a 3D printer.

After the 3D printing or writing process, a sample can preferably run through four development stages. First, the sample is placed in a beaker with a developer (e.g. "mr-Dev 600" from micro resist technology GmbH). Care should be taken that the sample is immersed in the developer as slowly and horizontally as possible. This can prevent the fine spring turns from being destroyed during development. After a 15-minute development time, the sample is rinsed in isopropanol for about 2 minutes. This will wash the developer from the sample and remove the last unpolymerized residues of the IP-S resist. In the penultimate step, the sample is carefully dried with nitrogen gas. In order to allow the microstructures to harden completely, they are finally placed in a laboratory oven at 100° C. for one hour. After the development process, the samples can be examined and assessed under the microscope. The support or auxiliary structures 9, if any, can then be removed using the micropipette of the inkjet printer. Finally, the samples or cavities can be filled with the magnetic substance.

With the help of the present invention, magnetic nano- or microparticles can be integrated into optical microsystems and thus the 3D-printed micro-objectives can be made movable using magnetic excitation. In particular in combination with flexible spring elements, a repeatable movement of the system components is possible, both statically and in resonance mode. One advantage of the solution described is, in particular, that the optics can be controlled by applying an external magnetic field across a greater distance. After the integration of the magnetic or magnetizable material into the micro-optical components, further functional elements can also be positioned and positioned and fixed under live observation. In addition to the realization of zoom or tilting systems, it would also be conceivable to implement a compensator, for example to correct aberrations.

The present invention makes it possible to make components, individual lenses or lens groups in a 3D-printed micro-objective movable. In this way, it solves a problem that has up to now not be solved on this size scale and e.g. directly on the tip of glass fibers. In summary, movable, controllable optical components in the sub-millimeter range can be created and controlled with the invention. In particular, the production of compact, actuatable micro-optics that can be precisely and quickly controlled by a magnetic field is made possible. In this way, e.g. zoom systems, focusable optics, compensator elements or variable apertures can be created. Alternatively, however, the invention can also be used for a high-precision alignment. For example, an optical component could be aligned with high precision with respect to a second component by means of an external magnetic field.

REFERENCE NUMERAL LIST 2 optical element
4 microfluidic cavity/void
6 magnetic substance
8 actuating device
8a spring element
8b spring element support
8c actuating device frame
8d film hinge
9 support structure
11 guide element
13 microcoil
15 magnetizable sleeve
20 fiber (glass fiber)/fiber bundle
50 three-dimensional structure
100 optical device
A axis
B magnetic field
F force
S10 forming of a three-dimensional structure
S20 filling of at least one microfluidic cavity of the three-dimensional structure formed with a magnetic substance

The invention claimed is:

1. A method of fabricating an actuatable optical device, the method comprising:
   forming, via a 3D printer, a three-dimensional structure including at least one optical element having at least one microfluidic cavity for accommodating a magnetic substance; and
   filling the at least one microfluidic cavity with the magnetic substance,
   wherein the three-dimensional structure is printed on one end of a fiber or a fiber bundle, wherein the three-dimensional structure further has a microcoil for generating a magnetic field with which an actuation of the at least one optical element can be monitored or controlled, and wherein the microcoil is arranged in such a way that it encloses the fiber or the fiber bundle at least in some part(s).

2. The method according to claim 1, wherein the magnetic substance comprises a ferrofluid and/or a liquid polymer having magnetic and/or magnetizable micro- or nanoparticles.

3. The method according to claim 1, further comprising:
   forming, via the 3D printer, at least one actuating device for positioning the at least one optical element, wherein the at least one actuating device comprises a spring element and/or a suspension element.

4. The method according to claim 3, wherein the actuating device and the at least one microfluidic cavity are designed and arranged to bring, as a result of an interaction of the magnetic substance with an applied magnetic field, the at least one optical element into an actuating position dependent on the magnetic field.

5. The method according to claim 1, wherein the three-dimensional structure further has a magnetizable sleeve, wherein the magnetizable sleeve is arranged such that the magnetizable sleeve encloses the fiber or the fiber bundle at least in some part(s).

6. The method according to claim 1, further comprising:
   forming, via the 3D printer, a second optical element having a second microfluidic cavity.

7. The method according to claim 6, further comprising:
   forming, via the 3D printer, at least two actuating devices with different spring constants.

8. The method according to claim 6, wherein the at least one microfluidic cavity and the second microfluidic cavity have different sizes and/or shapes and/or volumes.

9. The method according to claim 1, further comprising:
   forming, via the 3D printer, at least one guide element for guided movement of the at least one optical element.

10. The method according to claim 1, wherein the 3D printer is a 3D laser lithography system.

11. The method of claim 1, wherein the forming, via the 3D printer, the three-dimensional structure including the at least one optical element further includes forming the at least one optical element with a plurality of bores extending from the at least one microfluidic cavity to an exterior of the at least one optical element.

12. The method of claim 11, wherein filling the at least one microfluidic cavity with the magnetic substance includes applying the magnetic substance to the plurality of bores.

13. The method of claim 1, wherein the microcoil is configured to receive an applied voltage in order to generate the magnetic field.

* * * * *